United States Patent
Wharram et al.

(10) Patent No.: US 11,584,160 B2
(45) Date of Patent: Feb. 21, 2023

(54) VEHICLE HAVING ADJUSTMENT MECHANISM

(71) Applicants: Jason D Wharram, Amherstburg (CA); Douglas E Peirce, West Bloomfield, MI (US); James N Settles, Wyandotte, MI (US)

(72) Inventors: Jason D Wharram, Amherstburg (CA); Douglas E Peirce, West Bloomfield, MI (US); James N Settles, Wyandotte, MI (US)

(73) Assignee: FCA US LLC, Auburn Hills, MI (US)

( * ) Notice: Subject to any disclaimer, the term of this patent is extended or adjusted under 35 U.S.C. 154(b) by 589 days.

(21) Appl. No.: 16/708,901

(22) Filed: Dec. 10, 2019

(65) Prior Publication Data
US 2021/0170787 A1 Jun. 10, 2021

(51) Int. Cl.
| | | |
|---|---|---|
| *B60B 23/12* | (2006.01) | |
| *B62D 17/00* | (2006.01) | |
| *B60B 35/10* | (2006.01) | |
| *B60B 23/10* | (2006.01) | |

(52) U.S. Cl.
CPC .............. *B60B 23/12* (2013.01); *B60B 23/10* (2013.01); *B60B 35/1009* (2013.01); *B62D 17/00* (2013.01); *B60B 2320/10* (2013.01); *B60B 2340/52* (2013.01)

(58) Field of Classification Search
CPC ...................................................... B60G 7/02
See application file for complete search history.

(56) References Cited

U.S. PATENT DOCUMENTS

| | | | | |
|---|---|---|---|---|
| 2,525,217 | A * | 10/1950 | Glitsch | F16B 5/0642 |
| | | | | 261/114.5 |
| 3,880,444 | A * | 4/1975 | Bridges | B62D 17/00 |
| | | | | 280/86.753 |
| 5,104,142 | A | 4/1992 | Tsubota et al. | |
| 5,129,669 | A * | 7/1992 | Specktor | B60G 11/28 |
| | | | | 280/86.753 |
| 5,775,719 | A * | 7/1998 | Holden | B62D 17/00 |
| | | | | 280/86.75 |
| 6,550,795 | B1 * | 4/2003 | Schlosser | B60G 7/02 |
| | | | | 280/124.128 |
| 6,659,479 | B1 * | 12/2003 | Raidel, II | B60G 7/02 |
| | | | | 280/124.16 |
| 6,908,254 | B2 | 6/2005 | Atwater et al. | |
| 7,111,855 | B2 * | 9/2006 | Winkler | B60G 7/008 |
| | | | | 280/86.754 |

(Continued)

FOREIGN PATENT DOCUMENTS

| | | | | |
|---|---|---|---|---|
| BR | PI0618087 A2 * | 8/2011 | | |
| CA | 2413638 A1 * | 6/2003 | ............... | B60G 7/02 |

(Continued)

*Primary Examiner* — Nicole T Verley
(74) *Attorney, Agent, or Firm* — Ralph E Smith

(57) ABSTRACT

A vehicle includes a vehicle wheel, a vehicle frame and an adjustment mechanism configured to move the vehicle wheel relative to the vehicle frame. The adjustment mechanism includes a cam stud and a cam spacer. The cam stud extends at least partially through the vehicle frame. The cam spacer is rotationally fixed to the cam stud. Rotating the cam spacer moves the vehicle wheel relative to the vehicle frame.

12 Claims, 10 Drawing Sheets

(56) References Cited

U.S. PATENT DOCUMENTS

| | | | |
|---|---|---|---|
| 7,125,026 B2 * | 10/2006 | Genick, II | F16B 35/041 |
| | | | 280/86.753 |
| 7,370,868 B2 * | 5/2008 | Genick, II | F16B 35/041 |
| | | | 280/86.753 |
| 9,233,589 B1 * | 1/2016 | Miller | B60G 7/02 |
| 9,463,679 B2 | 10/2016 | Marinescu | |
| 9,701,171 B2 | 7/2017 | Marinescu | |
| 2004/0090030 A1 * | 5/2004 | Genick, II | F16B 35/041 |
| | | | 280/124.1 |
| 2005/0001397 A1 * | 1/2005 | Genick, II | F16B 35/041 |
| | | | 280/86.754 |
| 2007/0104556 A1 * | 5/2007 | Downey | F16B 43/00 |
| | | | 411/389 |
| 2016/0214678 A1 * | 7/2016 | Schlanger | B62K 25/02 |
| 2017/0015356 A1 * | 1/2017 | Weifenbach | B62D 17/00 |

FOREIGN PATENT DOCUMENTS

| | | | | |
|---|---|---|---|---|
| EP | 0255921 B1 * | 7/1987 | | |
| EP | 0255921 A2 * | 9/1992 | | |
| JP | 6203993 B2 * | 9/2017 | | |
| WO | WO-9706047 A1 * | 2/1997 | | B60G 7/02 |
| WO | WO-03049960 A1 * | 6/2003 | | B60G 7/02 |
| WO | WO-2005052386 A2 * | 6/2005 | | F16B 43/00 |
| WO | WO-2019112029 A1 * | 6/2019 | | B60G 13/003 |

\* cited by examiner

VEHICLE HAVING ADJUSTMENT MECHANISM

FIELD

The present disclosure relates to a vehicle having an adjustment mechanism.

BACKGROUND

This section provides background information related to the present disclosure and is not necessarily prior art.

A vehicle includes wheels that can be aligned relative to a vehicle frame to improve performance of the vehicle. Each wheel can be coupled to a link, which, in turn is coupled to a vehicle frame via an adjustment mechanism. The adjustment mechanism can be actuated to align the vehicle wheel. The adjustment mechanism needs to be accessed from both sides of the link (or vehicle frame), which facilitates assembly and adjustment of the adjustment mechanism. The teachings of the present disclosure provides an adjustment mechanism that allows for assembly and adjustment from a single side of the link (or vehicle frame).

SUMMARY

This section provides a general summary of the disclosure, and is not a comprehensive disclosure of its full scope or all of its features.

In one form, the present disclosure provides a vehicle that includes a vehicle wheel, a vehicle frame and an adjustment mechanism. The adjustment mechanism is configured to move the vehicle wheel relative to the vehicle frame. The adjustment mechanism includes a cam stud and a cam spacer. The cam stud is coupled to the vehicle frame and extends at least partially through the vehicle frame. The cam spacer is rotatably coupled to the cam stud. Rotating one side of the cam stud and the cam spacer moves the vehicle wheel relative to the vehicle frame.

In some configurations of the vehicle of the above paragraph, the cam spacer is positioned at one side of the vehicle frame and an eccentric cam washer is rotatably coupled to the cam stud and positioned at another side of the vehicle frame that is opposite the one side. Rotation of the cam stud and the cam spacer rotates the eccentric cam washer to facilitate movement of the vehicle wheel relative to the vehicle frame.

In some configurations of the vehicle of any one or more of the above paragraphs, the eccentric cam washer includes an inner diametrical surface having a protrusion extending radially inwardly therefrom and the cam spacer includes an inner diametrical surface having a projection extending radially inwardly therefrom.

In some configurations of the vehicle of any one or more of the above paragraphs, the cam stud includes an elongated washer groove and an elongated spacer groove that are spaced apart from each other. The protrusion is received in the elongated washer groove to rotatably couple the cam washer and the cam stud and the projection is received in the elongated spacer groove to rotatably couple the cam spacer and the cam stud.

In some configurations of the vehicle of any one or more of the above paragraphs, the cam stud includes a spacer portion and a washer portion that are spaced apart from each other. The cam spacer is rotatably coupled to the spacer portion and the cam washer is rotatably coupled to the washer portion.

In some configurations of the vehicle of any one or more of the above paragraphs, the adjust mechanism further includes a spacer nut threadably engaged with the spacer portion of the cam stud and a washer nut threadably engaged with the washer portion of the cam stud. The vehicle frame and the spacer nut cooperate to prevent axial movement of the cam spacer and the vehicle frame and the washer nut cooperate to prevent axial movement of the cam washer.

In some configurations of the vehicle of any one or more of the above paragraphs, the cam washer and the cam spacer are positioned between the spacer nut and the washer nut.

In some configurations of the vehicle of any one or more of the above paragraphs, the cam stud includes a spacer portion and an unthreaded portion that are adjacent to each other. The cam spacer is engaged with the spacer portion and the unthreaded portion is at least partially positioned within a link coupled to the vehicle wheel.

In some configurations of the vehicle of any one or more of the above paragraphs, the unthreaded portion has a diameter that is greater than a diameter of the spacer portion.

In some configurations of the vehicle of any one or more of the above paragraphs, the cam stud includes a driving portion extending from an end of the spacer portion. A diameter of the driving portion is smaller than a diameter of the spacer portion and the unthreaded portion.

In some configurations of the vehicle of any one or more of the above paragraphs, the vehicle frame includes an elongated slot formed therein. The cam stud is configured to traverse the elongated slot when the one of the cam stud and the cam spacer is rotated.

In another form, the present disclosure provides a method for moving a vehicle wheel relative to a vehicle frame. The method includes inserting a cam stud at least partially through the vehicle frame; rotatably connecting a cam spacer to the cam stud; and rotating one of the cam spacer and the cam stud to move the vehicle wheel relative to the vehicle frame. The cam stud is inserted from a side of the vehicle wheel. The cam spacer is rotatably connected to the cam stud from the side of the vehicle wheel after the cam stud is inserted at least partially through the vehicle frame. The cam spacer is rotated from the side of the vehicle frame.

In some configurations of the method of the above paragraph, the method further includes positioning a spacer nut on the cam stud from the side of the vehicle frame. The spacer nut is rotatable relative to the cam stud.

In some configurations of the method of any one or more of the above paragraphs, the spacer nut is spaced apart from the cam spacer when the one of the cam spacer and the cam stud is rotating.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
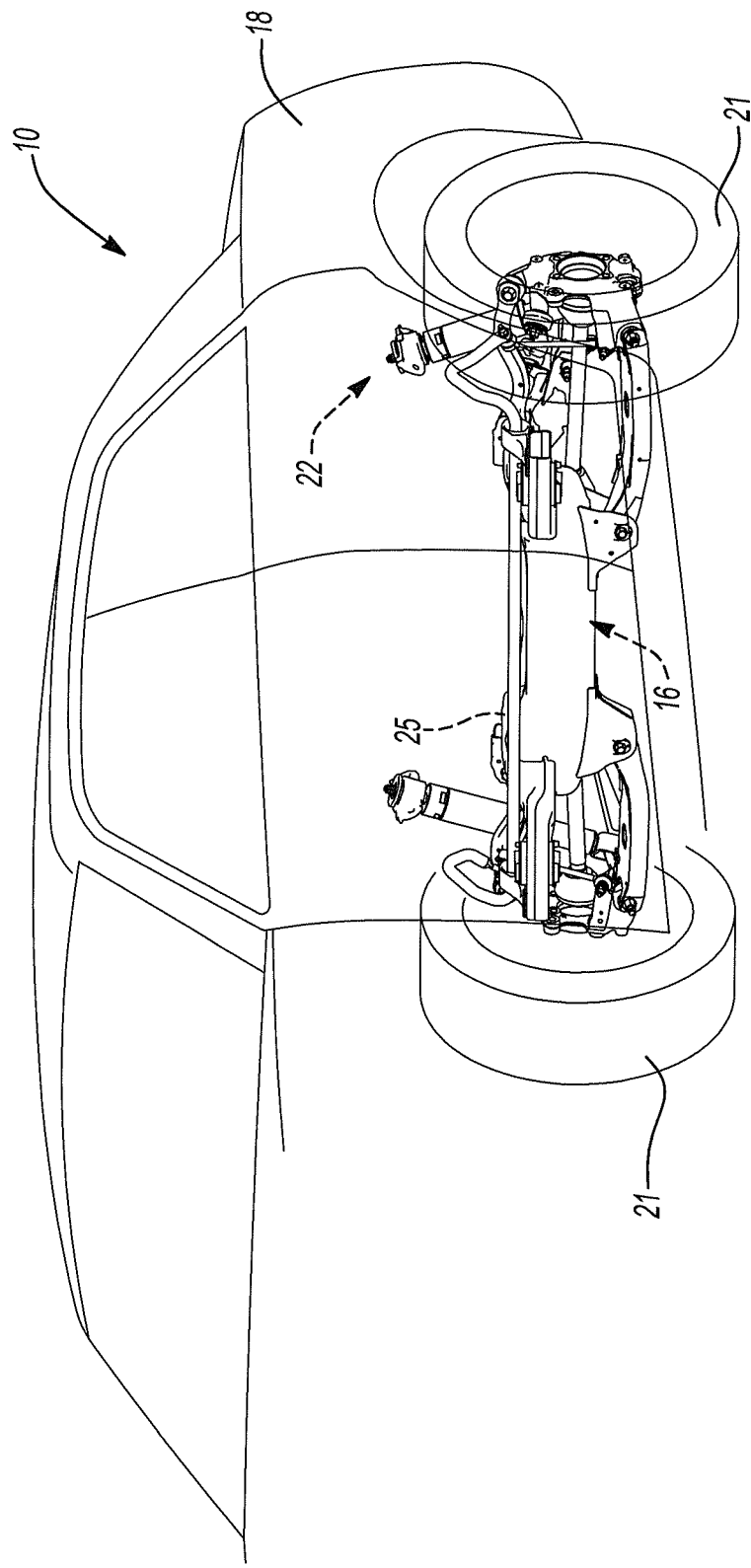
FIG. 1 is a partial perspective view of a vehicle having a rear sub frame and an adjustment mechanism according to the principles of the present disclosure.

As shown in FIG. 1, a vehicle 10 is provided. The vehicle 10 includes a mainframe or chassis (not shown), a front sub frame or first vehicle component (not shown) and a rear sub frame or second vehicle component 16. The mainframe supports, inter alia, a vehicle body 18 and can at least partially support a powertrain system (not shown) and a drivetrain system (not shown). Rotary power generated by the powertrain system is transmitted to the drivetrain system to drive at least one of a set of front wheels (not shown) and a set of rear wheels 21. The front sub frame is attached to the mainframe at a front end thereof and at least partially supports the powertrain system and a front suspension system (not shown). The rear sub frame 16 is attached to the mainframe at a rear end thereof and at least partially supports the drive train system and a rear suspension system 22.

Figure 2:
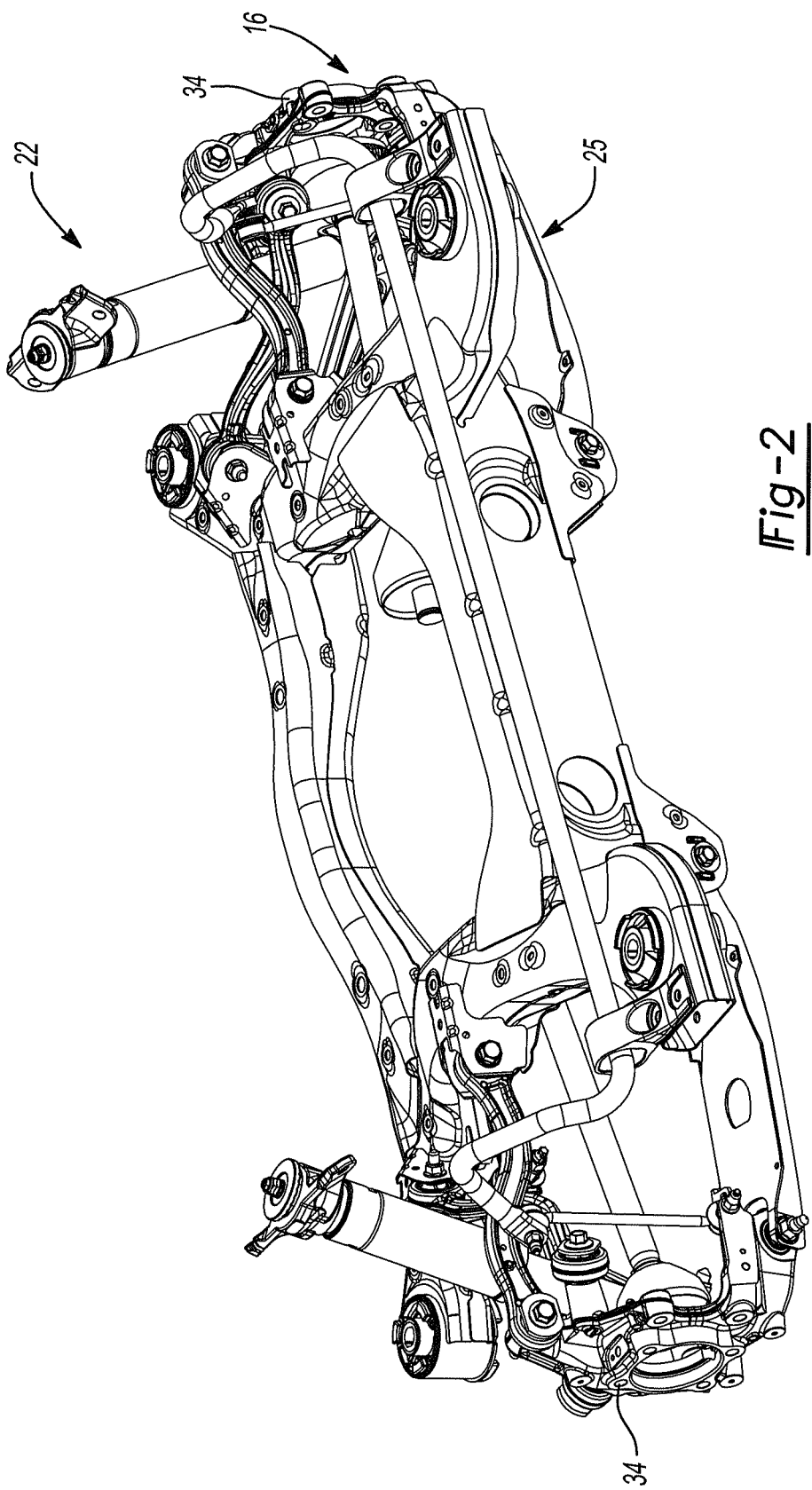
FIG. 2 is a perspective view of a rear sub frame of the vehicle of FIG. 1.
Figure 3:
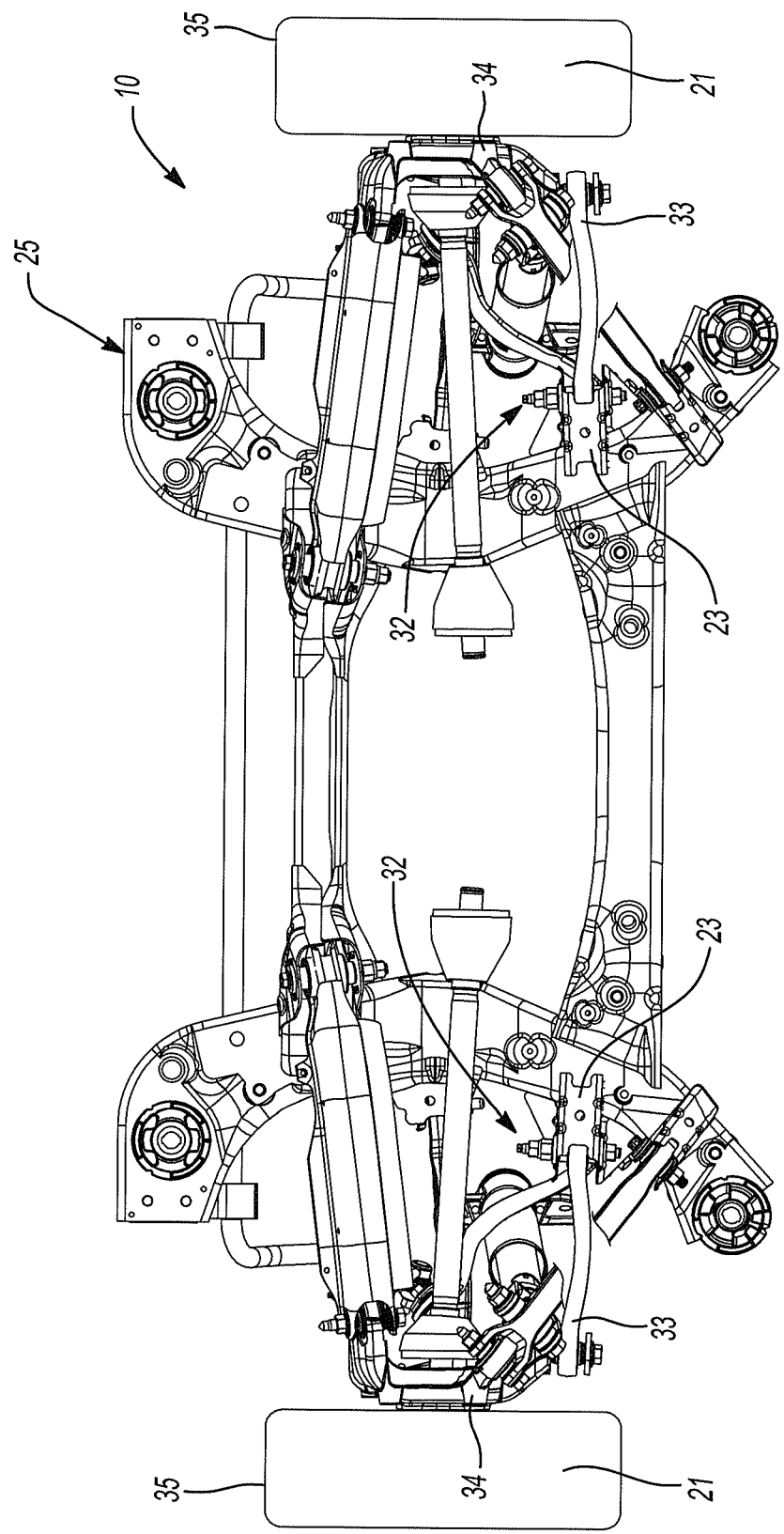
FIG. 3 is a bottom view of the rear sub frame of the vehicle of FIG. 1.
Figure 4:
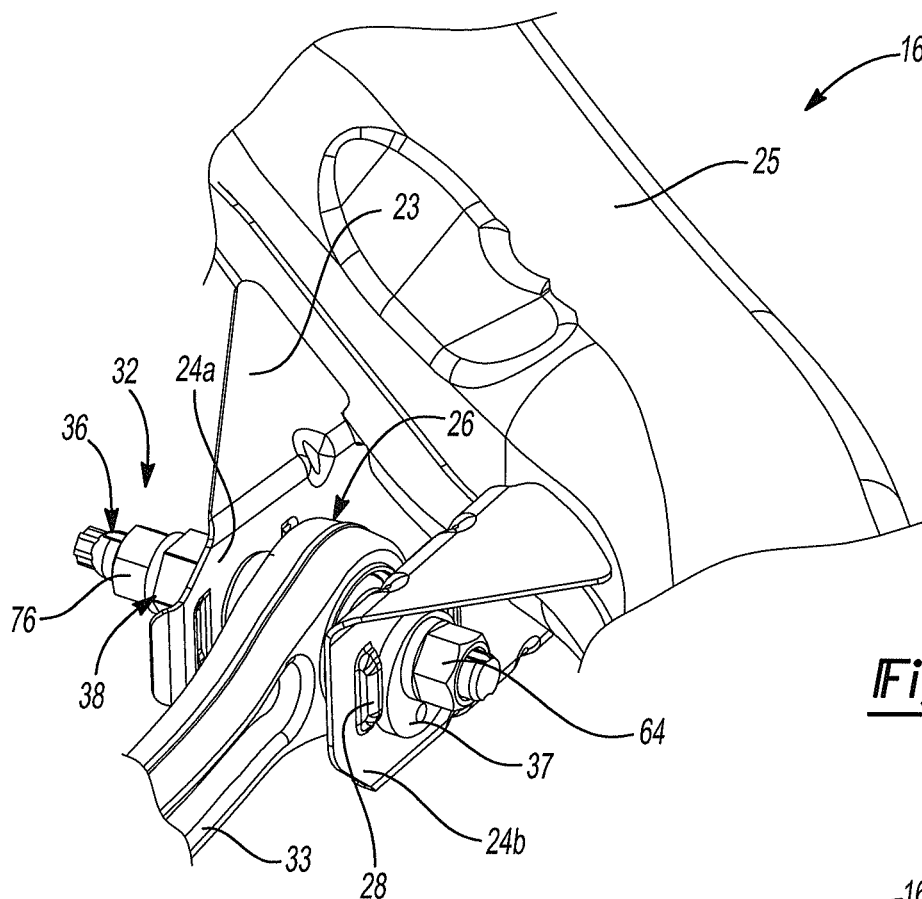
FIG. 4 is a partial perspective view of a link coupled to the rear sub frame using an adjustment mechanism.
Figure 5:
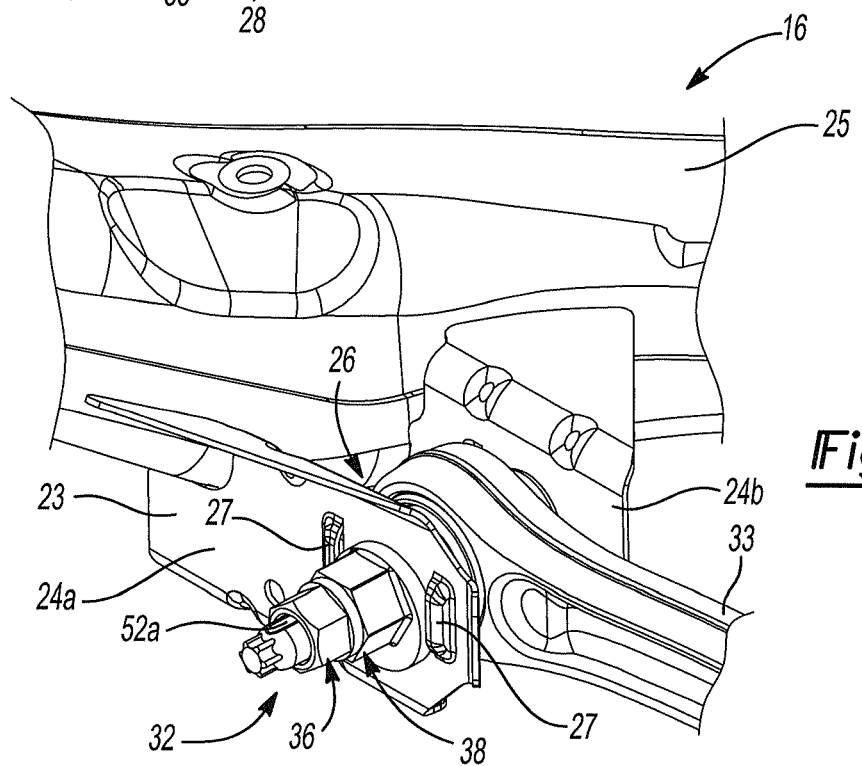
FIG. 5 is another partial perspective view of the link coupled to the rear sub frame using the adjustment mechanism.

With reference to FIGS. 2 and 3, the rear sub frame 16 includes, inter alia, a body 25 and a pair of toe link connections 23 (FIG. 3) that extend outwardly from a respective side of the body 25. With references to FIGS. 4-8, each toe link connection 23 includes opposing sidewalls 24a, 24b and a bottom wall 29 (FIGS. 6-8) that cooperate to define a space 26. A pair of tabs 27 extend outwardly from the sidewall 24a and cooperate with each other to define a slot 30a. Similarly, a pair of tabs 28 extend outwardly from the sidewall 24b and cooperate with each other to define a slot 30b. The sidewall 24a includes an elongated slot or opening 31a formed therein and positioned between the pair of tabs 27, and the sidewall 24b includes an elongated slot or opening 31b formed therein and positioned between the pair of tabs 28. The openings 31a, 31b of the sidewalls 24a, 24b, respectively, are aligned with each other.

An adjustment mechanism 32 couples a respective toe link or vehicle component 33 to the rear sub frame 16 and is configured to move (or adjust) the respective toe link 33 relative to the rear sub frame 16, which, in turn, causes one rear wheel 21 of the set of rear wheels 21 to move inboard (i.e., the front 35 of the rear wheel 21 is angled inwardly toward a center of the vehicle 10) or outboard (i.e., the front 35 of the rear wheel 21 is angled outwardly away from the center of the vehicle 10). That is, the respective toe link 33 is coupled to the rear sub frame 16 (via the adjustment mechanism 32) at one end thereof and is coupled to the one rear wheel 21 (via a wheel knuckle 34) at the other end thereof. The adjustment mechanism 32 is configured to move the respective toe link 33 relative to the rear sub frame 16 to align the one rear wheel 21 (and the wheel knuckle 34) to a proper position.

Figure 6:
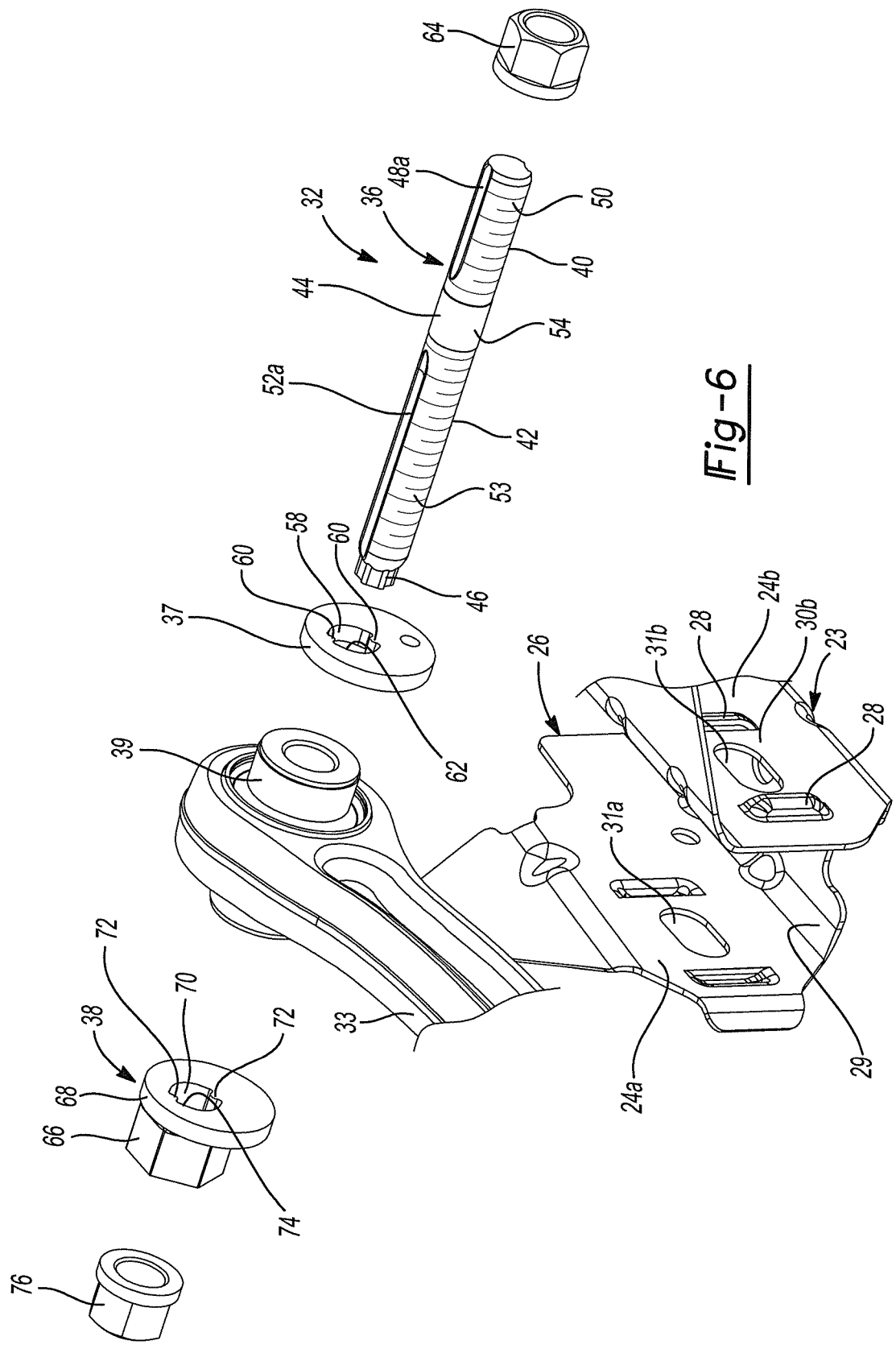
FIG. 6 is an exploded view of the adjustment mechanism.
Figure 7:
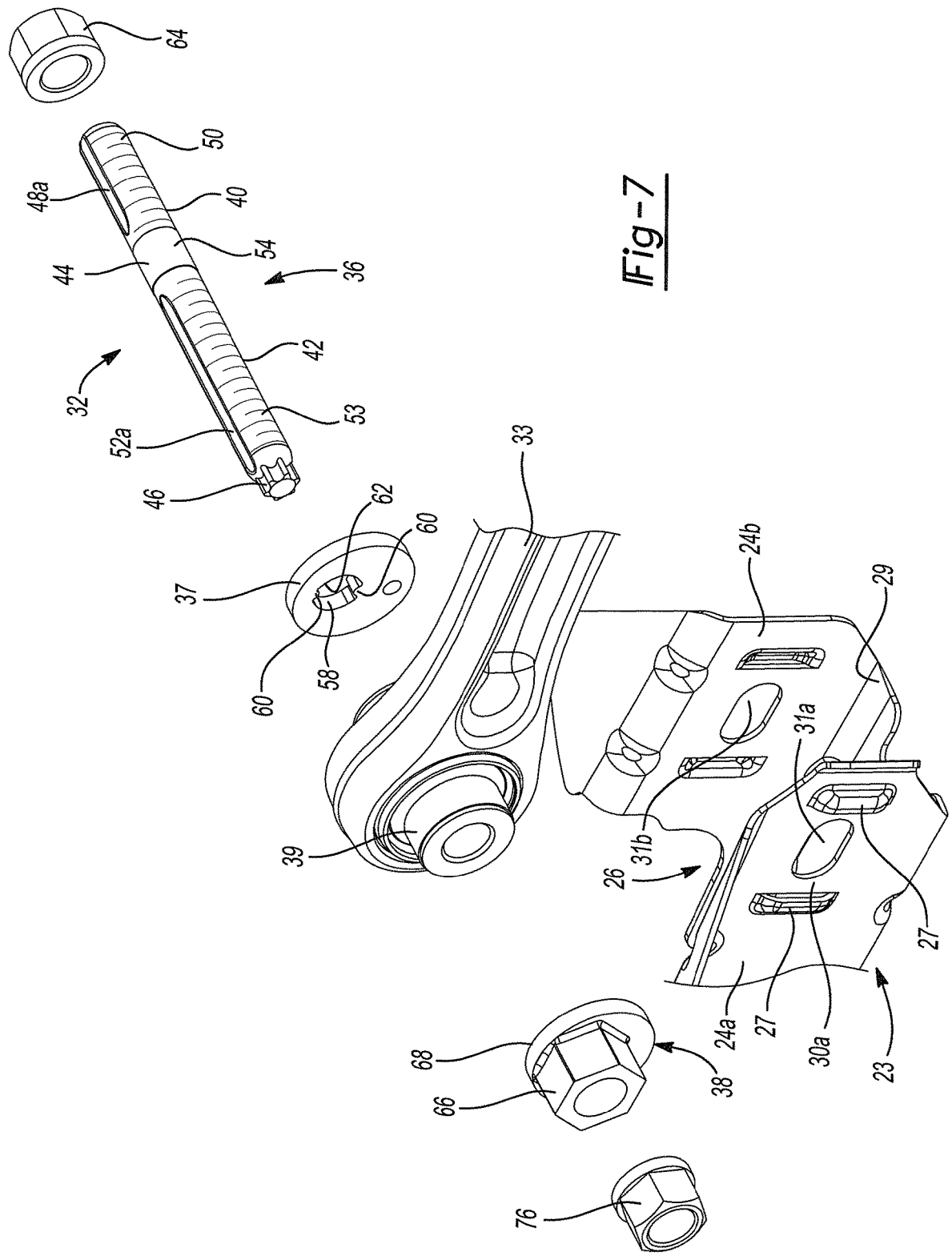
FIG. 7 is another exploded view of the adjustment mechanism.
Figure 8:
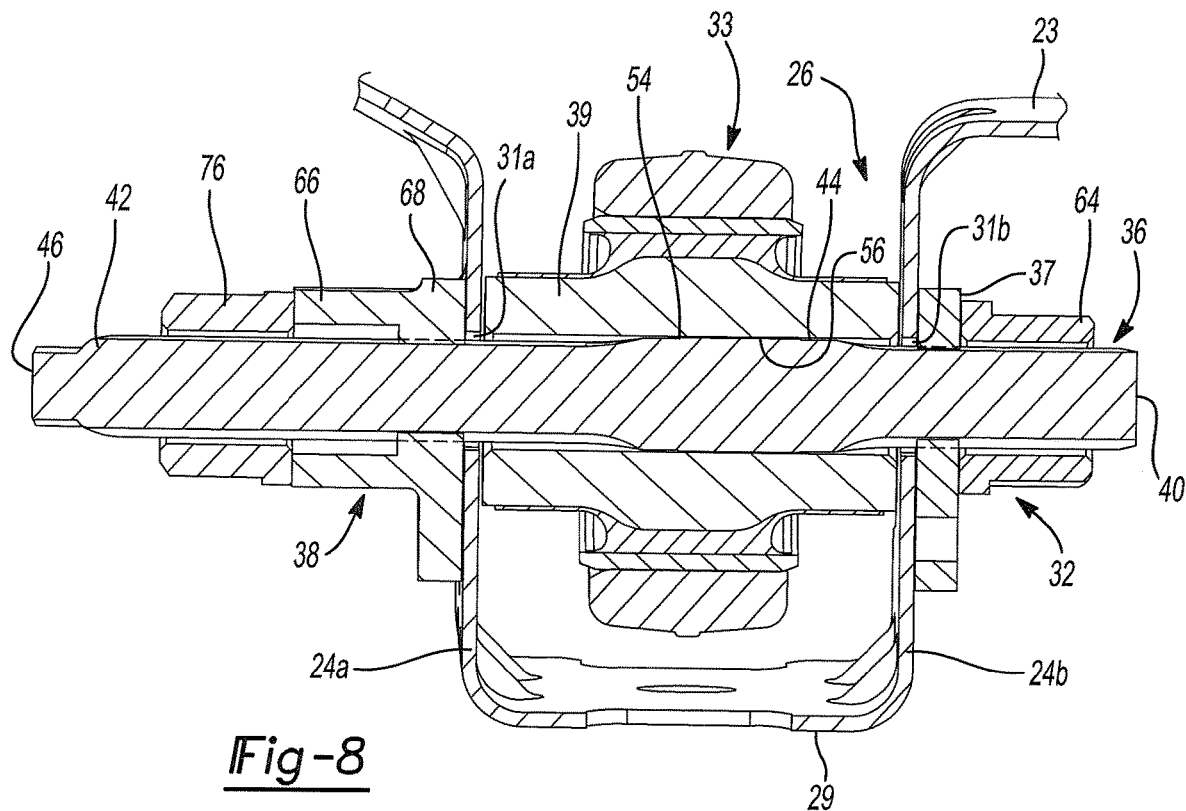
FIG. 8 is a cross-sectional view of the adjustment mechanism.

As shown in FIGS. 6-8, each adjustment mechanism 32 includes a cam stud 36, an eccentric cam washer 37 and an eccentric cam spacer 38. The cam stud 36 extends through the cam washer 37, the cam spacer 38, the elongated openings 31a, 31b and through a bushing 39 of a respective toe link 33. The cam stud 36 includes a washer portion 40, a spacer portion 42, an unthreaded portion 44 and a driving portion 46 (i.e., the cam stud 30 does not include a head, unlike bolts or screws). The washer portion 40 is at least partially threaded and includes elongated grooves 48a, 48b formed in an outer diametrical surface 50 thereof. The grooves 48a, 48b are diametrically opposed to each other. The spacer portion 42 is at least partially threaded and includes elongated grooves 52a (only one groove 52a shown in the figures) formed in an outer diametrical surface 53 thereof. The grooves 52a are also diametrically opposed to each other. The spacer portion 42 has a length that is greater than that of the washer portion 40, the unthreaded portion 44 and the driving portion 46.

The unthreaded portion 44 is disposed between the washer portion 40 and the spacer portion 42 and includes a diameter that is greater than a diameter of the washer portion 40 and a diameter the spacer portion 42. The diameter of the washer portion 40 is equal to the diameter of the spacer portion 42. In some configurations, the diameter of the washer portion 40 is greater or smaller than the diameter of the spacer portion 42. The unthreaded portion 44 is positioned within the bushing 39 of the respective toe link 33 and includes an outer diametrical surface 54 that engages an inner diametrical surface 56 of the bushing 39 (FIG. 8). The driving portion 46 has a hexagonal shape and extends from an end of the spacer portion 42. It should be understood that the shape of driving portion 46 may be rectangular, pentagonal, heptagonal, octagonal, or any other suitable shape that permits rotating of the cam stud 36 via a tool (not shown). The driving portion 46 has a diameter that is smaller than the diameter of the spacer portion 42, the diameter of the washer portion 40 and the diameter of the spacer portion 42.

The eccentric cam washer 37 is disposed on the washer portion 40 of the cam stud 36 and is positioned within the slot 30b formed by the pair of tabs 28 extending from the sidewall 24b. The cam washer 37 includes an opening 58 formed therein. The opening 58 has a center that is offset from a center of the cam washer 37. Protrusions or projections 60 extend radially inwardly from an inner diametrical surface 62 of the opening 58 (i.e., perpendicularly to a longitudinal axis of the cam stud 36) and are received in respective grooves 48a, 48b formed in the washer portion 40. In this way, the cam washer 37 and the cam stud 36 are rotationally fixed to each other. A nut 64 is threadably engaged with the washer portion 40 and cooperates with the sidewall 24b to secure the cam washer 37 within the slot 30b (i.e., prevent axial movement of the cam washer 37).

The eccentric cam spacer 38 is disposed on the spacer portion 42 of the cam stud 36 and is positioned within the slot 30a formed by the pair of tabs 27 extending from the sidewall 24a. The cam spacer 38 includes a nut 66 and a washer 68 integrally formed with each other as single component. The washer 68 is positioned within the slot 30a formed by the pair of tabs 27 extending from the sidewall 24a and includes an opening 70 formed therein. The opening 70 has a center that is offset from a center of the washer 38. Protrusions or projections 72 extend radially inwardly from an inner diametrical surface 74 of the opening 70 (i.e., perpendicularly to the longitudinal axis of the cam stud 36) and are received in respective grooves 52a formed in the spacer portion 42 of the cam stud 36. In this way, the cam stud 36 and the cam spacer 38 are rotationally fixed to each other. A nut 76 is threadably engaged with the spacer portion 42 and cooperates with the sidewall 24a to secure the cam spacer 38 within the slot 30a (i.e., prevent axial movement of the cam spacer 38).

With continued reference to FIGS. 1-14, a method for assembling the toe links 33 to the rear sub frame 16 using the adjustment mechanism 32 will now be described in detail. It should be understood that although the method will describe in detail the assembly of one of the toe links 33 to the rear sub frame 16, the other toe link 33 can be assembled to the rear sub frame 16 using the same or a similar method.

Figure 9:
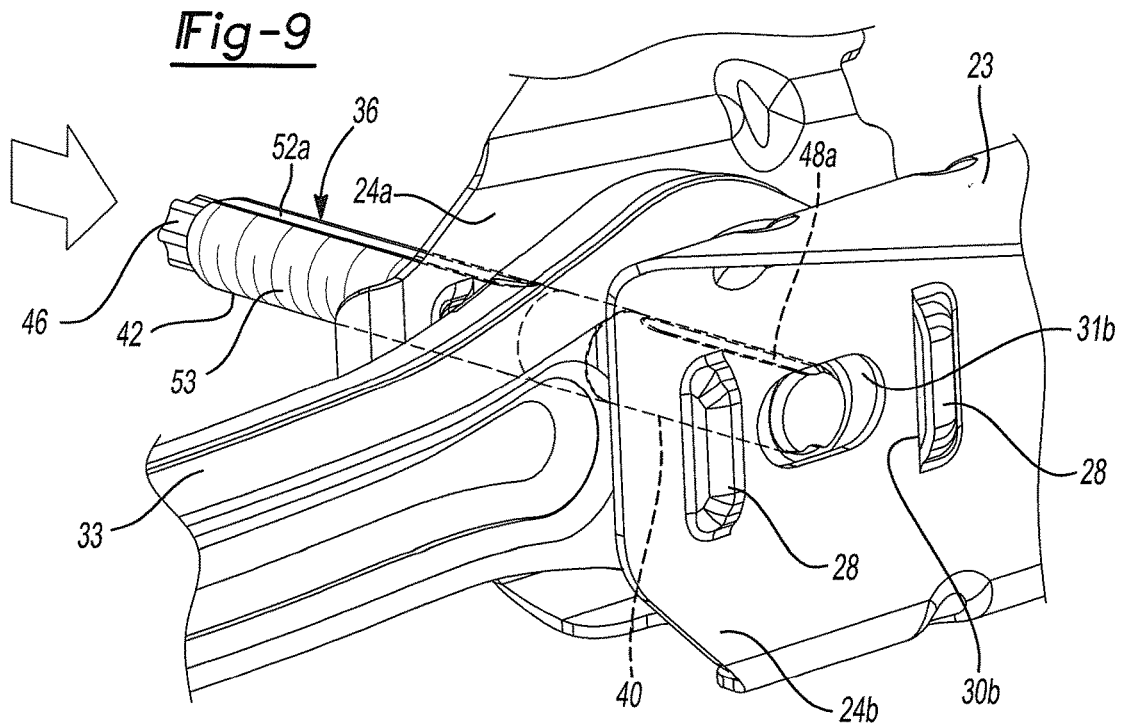
FIG. 9 is a partial perspective view of the rear sub frame showing a cam stud of the adjustment mechanism inserted therethrough and through the link.

First, as shown in FIG. 9, an end of the toe link 33 is positioned in the space 26 of the toe link connection 23 and the cam stud 36 is inserted from the sidewall 24a through the openings 31a, 31b and the hub 38 of the toe link 33.

Figure 10:
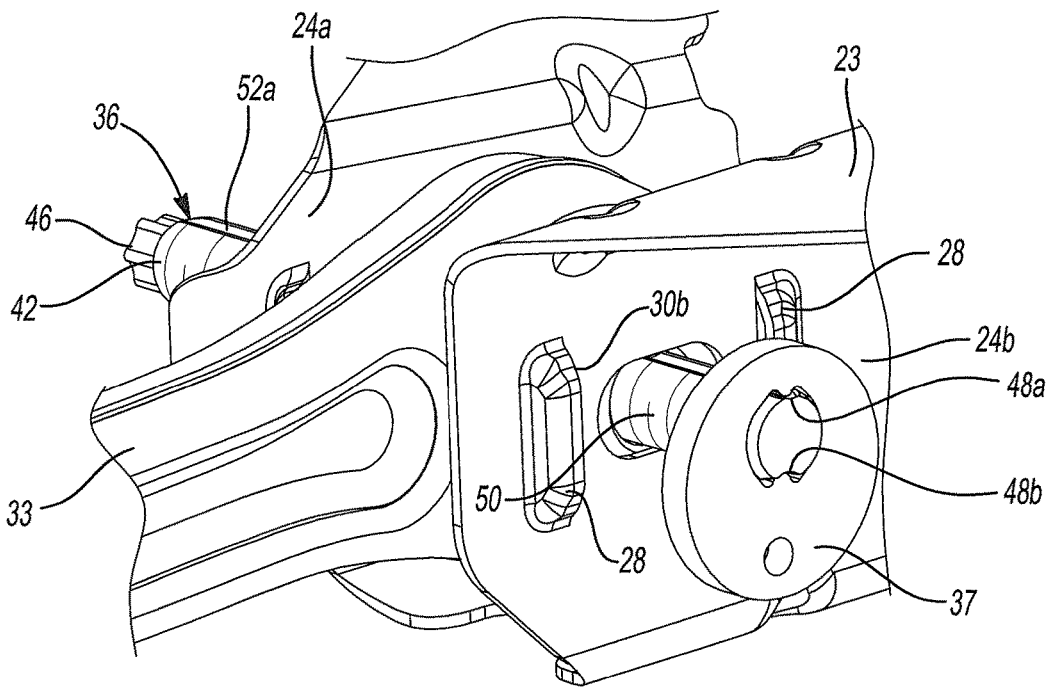
FIG. 10 is a partial perspective view of the rear sub frame showing a cam washer of the adjustment mechanism being coupled to the cam stud.
Figure 11:
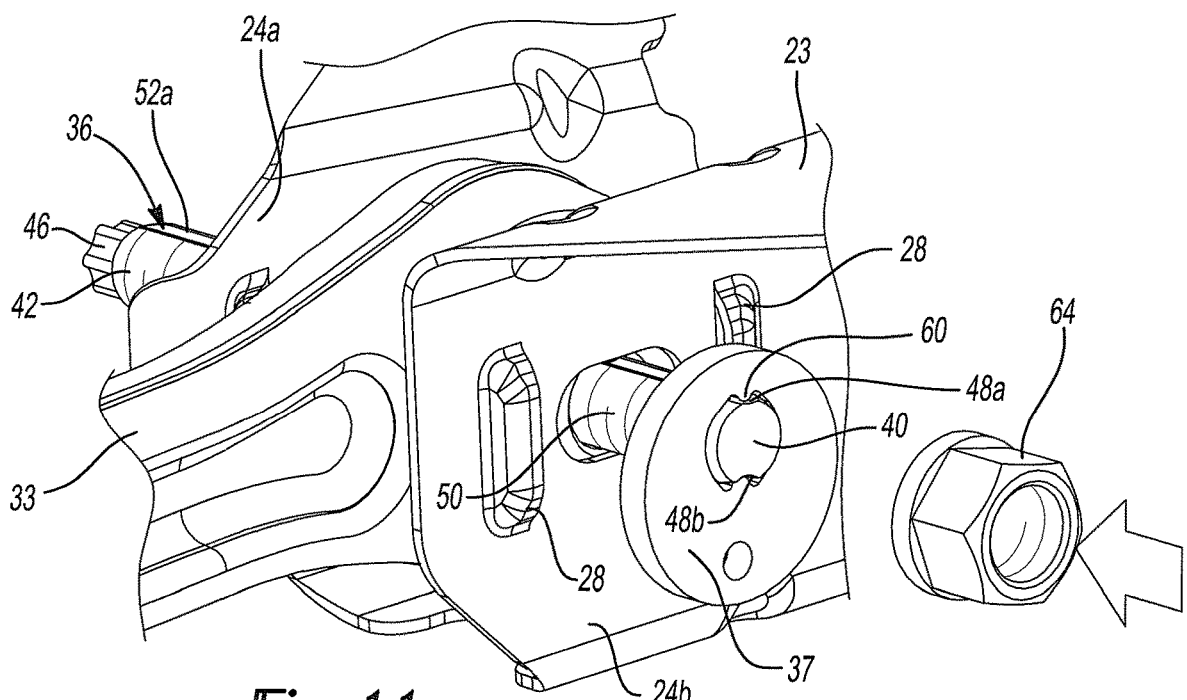
FIG. 11 is a partial perspective view of the rear sub frame showing a nut being coupled to the cam stud.

Next, as shown in FIGS. 10 and 11, the cam washer 37 is disposed on the washer portion 40 of the cam stud 36 so that the projections 60 of the cam washer 37 are received in respective grooves 48a, 48b of the washer portion 40. The nut 64 is also threadably engaged with the washer portion 40 of the cam stud 36.

Figure 12:
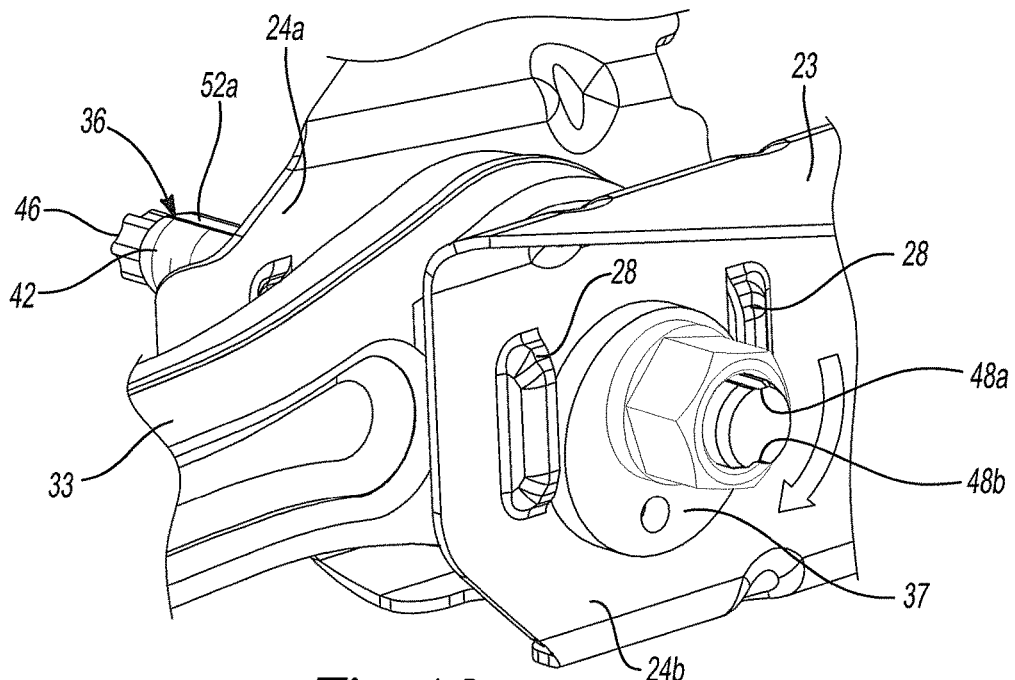
FIG. 12 is a partial perspective view of the rear sub frame showing the cam washer and the nut coupled to the cam stud after the cam stud has been driven.

Next, as shown in FIG. 12, the driving portion 46 is rotated by a tool (e.g., a drill) while the installer holds the nut 64 (i.e., the installer can hold the nut 64 by hand or by a tool (e.g., a wrench)), thereby causing the nut 64 and the cam washer 37 to traverse along the washer portion 40 of the cam stud 36 until cam washer 37 is positioned within the slot 31b and the projections 60 of the cam washer 37 are positioned at or near an end of the grooves 48a, 48b (i.e., the projections 60 of the cam washer 37 are positioned at or near the end of the grooves 48a, 48b adjacent to the unthreaded portion 44).

Figure 13:
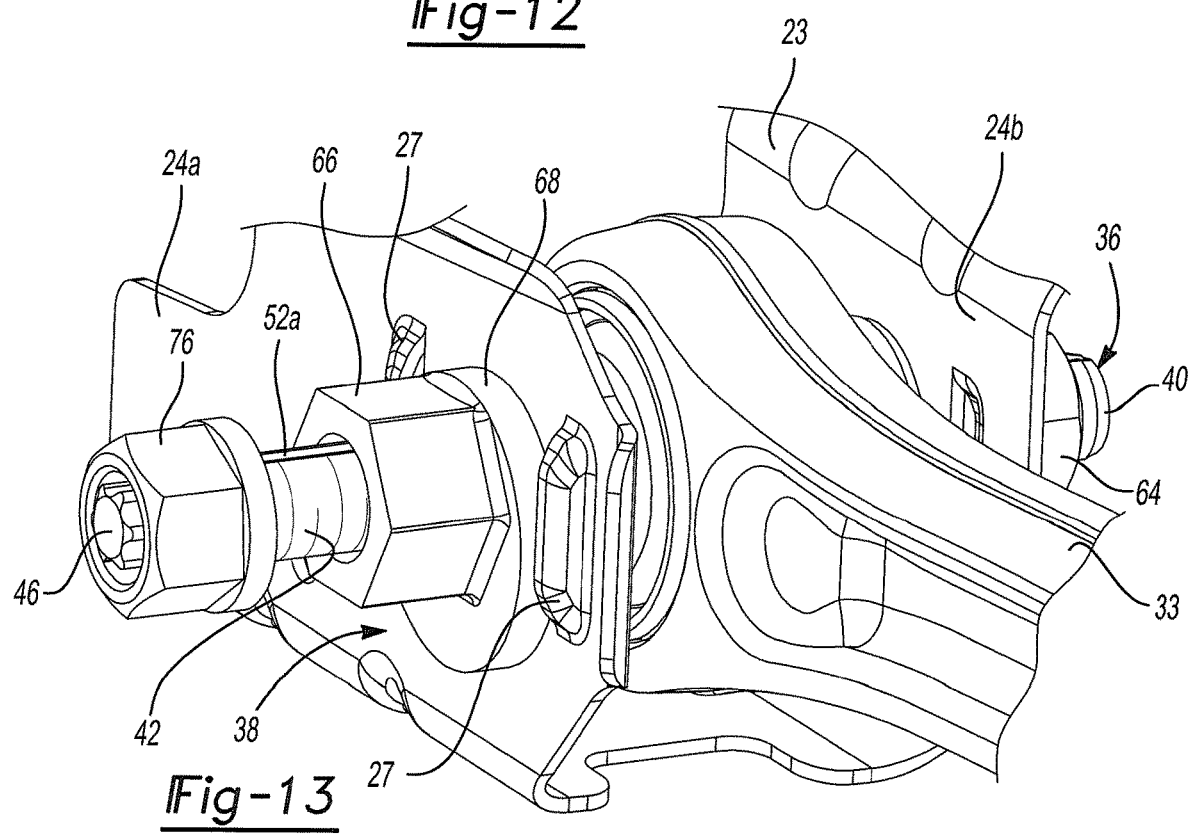
FIG. 13 is a partial perspective view of the rear sub frame showing a cam spacer and another nut of the adjustment mechanism being coupled to the cam stud.

Next, as shown in FIG. 13, the cam spacer 38 is threadably engaged with the spacer portion 42 of the cam stud 36 so that the washer 68 is positioned within the slot 31a. The nut 76 is also threadably engaged with the spacer portion 42 so that there is a gap or space between the nut 76 and the cam spacer 38. Next, the nut 66 of the cam spacer 38 can be rotated via a tool (e.g., a drill), which causes the cam washer 37 and the washer 38 to rotate along the tabs 27, 28, respectively. In this way, the cam stud 36 traverses the openings 31a, 31b, which causes the one rear wheel 21 (via the toe link 33 and the wheel knuckle 34) to move inboard or outboard. For example, the cam stud 36 traversing the openings 31a, 31b in a first direction (i.e., the first direction being toward the body 21 of the rear sub frame 16) causes the one rear wheel 21 to move inboard. In another example, the cam stud 36 traversing the openings 31a, 31b in a second direction that is opposite the first direction (i.e., the second direction being away from the body 21 of the rear sub frame 16) causes the one rear wheel 21 to move outboard.

Figure 14:
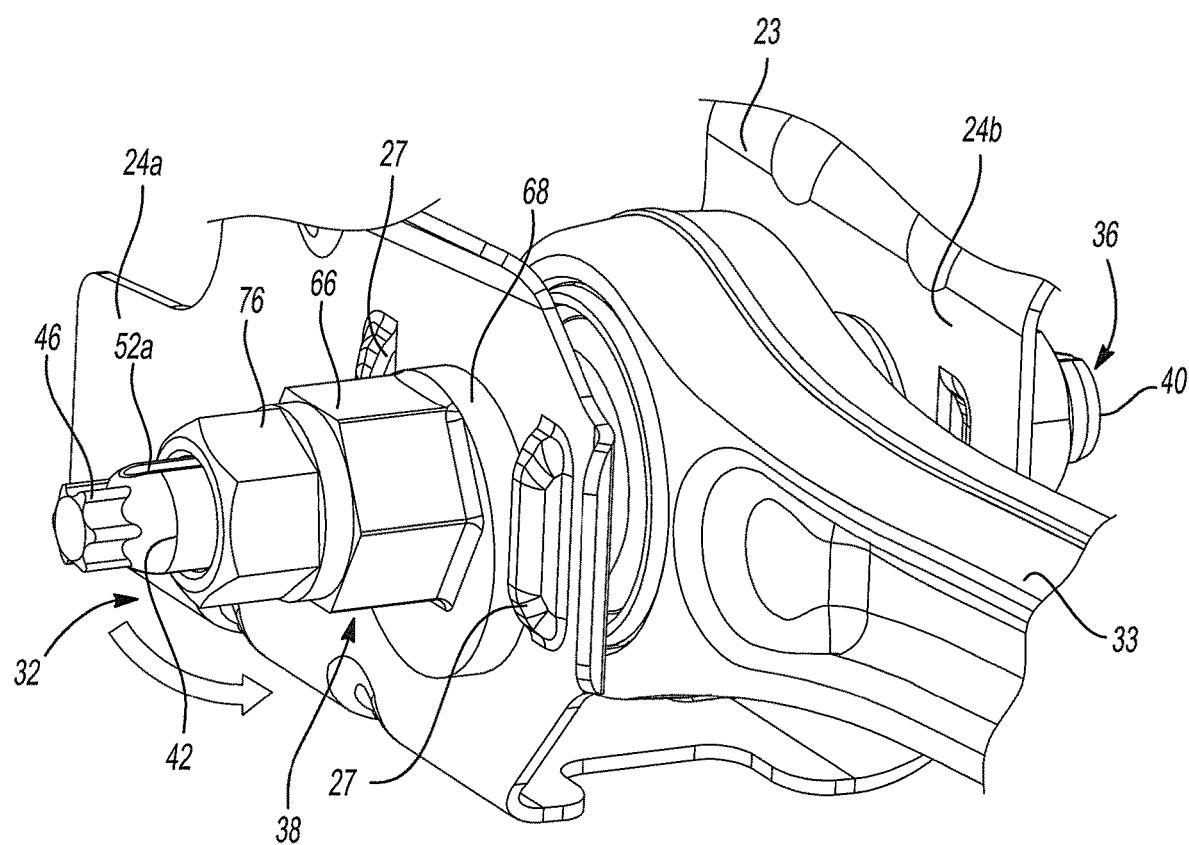
FIG. 14 is a partial perspective view of the rear sub frame showing the other nut torqued to secure the cam spacer in position.

Finally, as shown in FIG. 14, once the proper position is selected to align the one rear wheel 21, the nut 76 is torqued via a tool such that the nut 76 abuts against the cam spacer 38, thereby preventing axial movement of the cam spacer 38 and preventing the cam stud 36 from moving within the openings 31a, 31b.

The adjustment mechanism 32 of present disclosure provides the benefit of assembling vehicle components 16, 33 and adjusting the vehicle components 16, 33 relative to each other using the adjustment mechanism 32 from a single side of one of the vehicle components 16, 33 as well as assembling the adjustment mechanism 32 from the single side. That is, access from both sides of the vehicle components 16, 33 are not always possible due to a lack of space caused by the packaging of parts or components of the vehicle 10.

Although the adjustment mechanism 32 is described above as being used to assemble the toe link 33 to the rear sub frame 16 and adjusting the toe link 33 relative to the rear sub frame 16, the adjust mechanism 32 can also be used to assemble and adjust other components of the vehicle 10 to each other. For example, the adjustment mechanism 32 of the present disclosure can be used to assemble and adjust a toe link (not shown) to the front sub frame.

What is claimed is:

1. A vehicle comprising:
    a vehicle wheel;
    a vehicle frame; and
    an adjustment mechanism configured to move the vehicle wheel relative to the vehicle frame, the adjustment mechanism including a cam stud, an eccentric cam washer, and a cam spacer, the cam stud extending at least partially through the vehicle frame, and the cam spacer and the eccentric cam washer are each rotationally fixed to the cam stud,
    wherein the cam stud includes a spacer portion and a washer portion that are spaced apart from each other, and an unthreaded portion between the spacer portion and the washer portion,
    the unthreaded portion has a diameter that is greater than a diameter of the spacer portion and a diameter of the washer portion,
    the cam spacer is rotationally fixed to the spacer portion and the cam washer is rotationally fixed to the washer portion, and
    rotating the cam spacer moves the vehicle wheel relative to the vehicle frame.

2. The vehicle of claim 1, wherein the cam spacer is positioned at one side of the vehicle frame and the eccentric cam washer is rotationally fixed to the cam stud and positioned at another side of the vehicle frame that is opposite the one side, and wherein rotating the cam spacer rotates the eccentric cam washer to facilitate movement of the vehicle wheel relative to the vehicle frame.

3. The vehicle of claim 2, wherein the eccentric cam washer includes an inner diametrical surface having a protrusion extending radially inwardly therefrom and the cam spacer includes an inner diametrical surface having a projection extending radially inwardly therefrom.

4. The vehicle of claim 3, wherein the cam stud includes an elongated washer groove and an elongated spacer groove that are spaced apart from each other, and wherein the protrusion is received in the elongated washer groove to rotationally fix the eccentric cam washer and the cam stud and the projection is received in the elongated spacer groove to rotationally fix the eccentric cam spacer and the cam stud.

5. The vehicle of claim 1, wherein the adjustment mechanism further includes a spacer nut threadably engaged with the spacer portion of the cam stud and a washer nut threadably engaged with the washer portion of the cam stud, and wherein the vehicle frame and the spacer nut cooperate to prevent axial movement of the cam spacer and the vehicle frame and the washer nut cooperate to prevent axial movement of the eccentric cam washer.

6. The vehicle of claim 5, wherein the eccentric cam washer and the cam spacer are positioned between the spacer nut and the washer nut.

7. The vehicle of claim 1, wherein the unthreaded portion is at least partially positioned within a link connected to the vehicle wheel.

8. The vehicle of claim 1, wherein the cam stud includes a driving portion extending from an end of the spacer portion, and wherein a diameter of the driving portion is smaller than a diameter of the spacer portion and the unthreaded portion.

9. The vehicle of claim 1, wherein the vehicle frame includes an elongated slot formed therein, and wherein the cam stud is configured to traverse the elongated slot when the cam spacer is rotated.

10. A method for moving a vehicle wheel relative to a vehicle frame, the method comprising:
    inserting an adjustment mechanism including a cam stud, an eccentric cam washer, and a cam spacer at least partially through the vehicle frame, the cam stud being inserted from a side of the vehicle frame;
    rotationally fixing the cam spacer and the cam washer to the cam stud, the cam spacer being rotationally fixed to the cam stud from the side of the vehicle frame after the cam stud is inserted at least partially through the vehicle frame, and the cam washer being rotationally fixed to the cam stud from another side of the vehicle frame after the cam stud is inserted at least partially through the vehicle frame; and
    rotating the cam spacer, from the side of the vehicle frame, to move the vehicle wheel relative to the vehicle frame,
    wherein the cam stud includes a spacer portion and a washer portion that are spaced apart from each other, and an unthreaded portion between the spacer portion and the washer portion, and
    the unthreaded portion has a diameter that is greater than a diameter of the spacer portion and a diameter of the washer portion.

11. The method of claim 10, further comprising positioning a spacer nut on the cam stud from the side of the vehicle frame, the spacer nut rotatable relative to the cam stud and the cam spacer.

12. The method of claim 11, wherein the spacer nut is spaced apart from the cam spacer when the cam spacer is rotated.

* * * * *